United States Patent [19]

Batisse

[11] 4,420,360

[45] Dec. 13, 1983

[54] APPARATUS FOR THE INDUSTRIAL PRODUCTION OF FLOCK COATED ELECTRICAL WIRE

[75] Inventor: Claude Batisse, Berck Plage, France

[73] Assignee: Flocord S.A., Luxembourg

[21] Appl. No.: 279,306

[22] Filed: Jul. 1, 1981

[30] Foreign Application Priority Data

Jul. 2, 1980 [FR] France ................................ 80 14771
Jun. 4, 1981 [FR] France ................................ 81 11103

[51] Int. Cl.³ ........................ H01B 13/16; B32B 33/00

[52] U.S. Cl. .................................... 156/390; 118/623; 118/630; 118/640; 118/DIG. 22; 156/51; 156/356; 156/498; 427/26; 427/32; 427/118; 427/206; 428/90; 428/375

[58] Field of Search ..................... 156/51, 52, 56, 350, 156/356, 390, 498; 427/26, 32, 117, 118, 202, 203, 206; 428/90, 375; 118/623, 630, 640, DIG. 5, DIG. 22

[56] References Cited

U.S. PATENT DOCUMENTS 3,375,124 3/1968 Linneborn ............................ 427/32

*Primary Examiner*—Robert A. Dawson
*Attorney, Agent, or Firm*—Wolf, Greenfield & Sacks

[57] ABSTRACT

This invention concerns an apparatus for the industrial production of electrical conducting wires treated by flocking and coated with adhesive.

7 Claims, 9 Drawing Figures

APPARATUS FOR THE INDUSTRIAL PRODUCTION OF FLOCK COATED ELECTRICAL WIRE

The invention relates to an apparatus and process for the industrial production of electrical conducting wires treated by flocking and coated with adhesive, as well as the wires obtained using the apparatus and the process.

There are already known from the prior art devices and processes which make possible the flocking of products intended advantageously to replace the materials previously used for these purposes and comprising braids, velvets and fibres of vegetable or animal origin, these various products having a cost price which is much too high for them to be used.

However, these threads or wires treated by flocking are not conductors of electricity.

According to the known art, electrical conducting wires are conspicuous and contrast very strongly with the decor. Furthermore, electrical wires can only be fastened by clips, straps, nails or the like, which have the disadvantage of being difficult and time-consuming to fix in position and which, moreover, leave irremovable marks.

The main difficulty is to be found at the gluing station, since it is very difficult to distribute an adhesive uniformly and completely over a conducting wire of circular section so that the adhesive layer on the wire is regular and uniform. This particular difficulty arises especially from the fact that the wire has to be glued, then flocked and dried before being stored again on reels. Between the entrainment of the wire to effect its advance and the point of contact on the winding device, the wire is in the free, unsupported state and, therefore, there is no means for gripping this wire which, after gluing, is flocked then dried. Accordingly, the wire assumes a constant sag or deflection which has to be taken into account for the treatment of the wire to be effective. In other words, it is not possible to make use of means for correcting the curve described by the wire at the time of gluing, flocking and drying, without thereby harming the special properties which it is intended to impart to the electrical conducting wire.

The present invention therefore has the aim of devising electrical conducting wires treated by flocking and coating with adhesive, which have a pleasant aesthetic appearance and which blend in perfectly with the decor, these wires being coated with adhesive, moreover, so as to enable them to be fixed simply and reliably, no difficulty being presented when they are removed and having a relatively low cost price.

The present invention also has the aim of devising an electrical conducting wire which retains these electrical standards but at the same time blends in perfectly with the decor and can be manufactured industrially.

For this purpose, the invention relates to an apparatus for the industrial production of electrical conducting wires treated by flocking and coated with adhesive, characterised in that it comprises a device for flocking the wire and a device for applying adhesive, these devices being controlled and synchronised from a control panel as a function of defined and recorded parameters relating to the adhesives and to the linear speed of unwinding and winding of the wire maintained in the free, unsupported state.

It is thus possible to produce industrially, i.e. at lower price, electrical conducting wires which blend perfectly into interior decorations, while retaining these properties and electrical standards.

The present invention also makes it possible to maintain the wire without contact throughout its passage through the apparatus, even though this wire is quite heavy, which necessitates a rewinding under a low tension so as to avoid crushing caused by the pressure exerted by the number of coils on the reels.

According to another feature of the invention, the flocking device comprises a station for unwinding the wire from a reel, a gluing station for the distribution and gauging of an adhesive coating on the wire, a coating station for the wire by passing it through a potential-difference electric field, a drying station for the wire coated with synthetic fibers, a station for brushing and cooling the wire and a station for winding the wire.

According to another feature of the invention, the unwinding station comprises at least one reel of wire which is made to unwind by a group of cylinders driven by a mtor, this station constituting the starting point of the synchronisation and control of the apparatus.

According to another feature of the invention, the wire-gluing station comprises a hollow die for gauging and distributing the adhesive under pressure by means of a pump.

According to another feature of the invention, the gluing station comprises a support which can be positioned in a vertical plane by rotation about a pivot, the support carrying at least one support cylinder upstream of the gluing station, this cylinder serving as the last point of contact of the wire and for the entrainment of the wire, it being possible for two gluing cylinders, one arranged above the other, to be positioned by a swinging movement controlled from the support in a position in which the contact surface of the gluing cylinders coincides with the deflection of the wire occurring at the level of the support cylinder.

The possibility of swinging the gluing-station assembly so as to retain the deflection of the wire makes possible greater efficiency during the actual gluing operation. Moreover, this property of the gluing station enables the wire to be passed between the gluing rollers with the lowest friction possible and necessary for gluing, while obtaining a regular and uniform layer of adhesive over the conductor wire.

According to another feature of the invention, the coating station comprises a positive electrode and a negative electrode creating a potential-difference electric field, through which the wire passes and where it is coated with synthetic fibres.

According to another feature of the invention, the drying station comprises a tunnel oven in which the wire coating is dried or polymerised, this oven being heated by forced-air generators controlled from the control panel and regulated by temperature-control members.

According to another feature of the invention, the winding station for the treated wire comprises cylinders which work in accordance with the principle of a pulley block and are driven by a variable-torque motor so as to exert a slight but constant tension on the wire being wound on to a storage reel.

According to another feature of the invention, the adhesive-applying device comprises at least one reel loaded with wire coming from the flocking device, a gluing station, a station for supplying a protective film intended to be placed on the glued wire, a group of cylinders driven by a motor for controlling the unwinding of the wire coated with the protective film and at least one storage reel which can be caused to rotate by a variable-torque motor and to undergo movement of translation by a second motor.

According to another feature of the invention, the gluing station comprises a depositing head for a hot melt adhesive.

According to another feature of the invention, the station for supplying the protective film comprises a main reel cooperating with guide members, one of these members being applied against one of the cylinders for entraining the wire so as to fix the protective film on the wire, the unwinding speed of the protective film being controlled by a regulating dolly, forming part of the guide members, and by a motor for unwinding the main reel in synchronism with the motor controlling the cylinders for entraining the wire covered with the protective film.

According to another feature of the invention, the supply station for the protective film is provided with a cutting device making it possible to cut up the load of the main reel into narrow strips constituting the protective film.

The invention also relates to a process for the industrial production of electrical conducting wires treated by flocking and coated with adhesive, according to which the wire is passed through the flocking device and through the device for applying adhesive along a path determined by the entrainment cylinders and the guide members so as to produce a relatively slight tension on the wire, which is favourable for the winding on to the reels but sufficient to keep the wire in the free, unsupported state.

The invention also relates to the wires obtained using the apparatus and process, characterised in that they have an aesthetic appearance which blends in perfectly with the interior decorations (wall coverings and the like) of a building and are conductors of electricity.

The present invention will be better understood on the basis of one mode embodiment of the apparatus making it possible to carry out the process for the industrial production of electrical conducting wires treated by flocking and coated with adhesive, illustrated diagrammatically by way of non-restrictive example in the accompanying drawings, in which.

Figure 1:
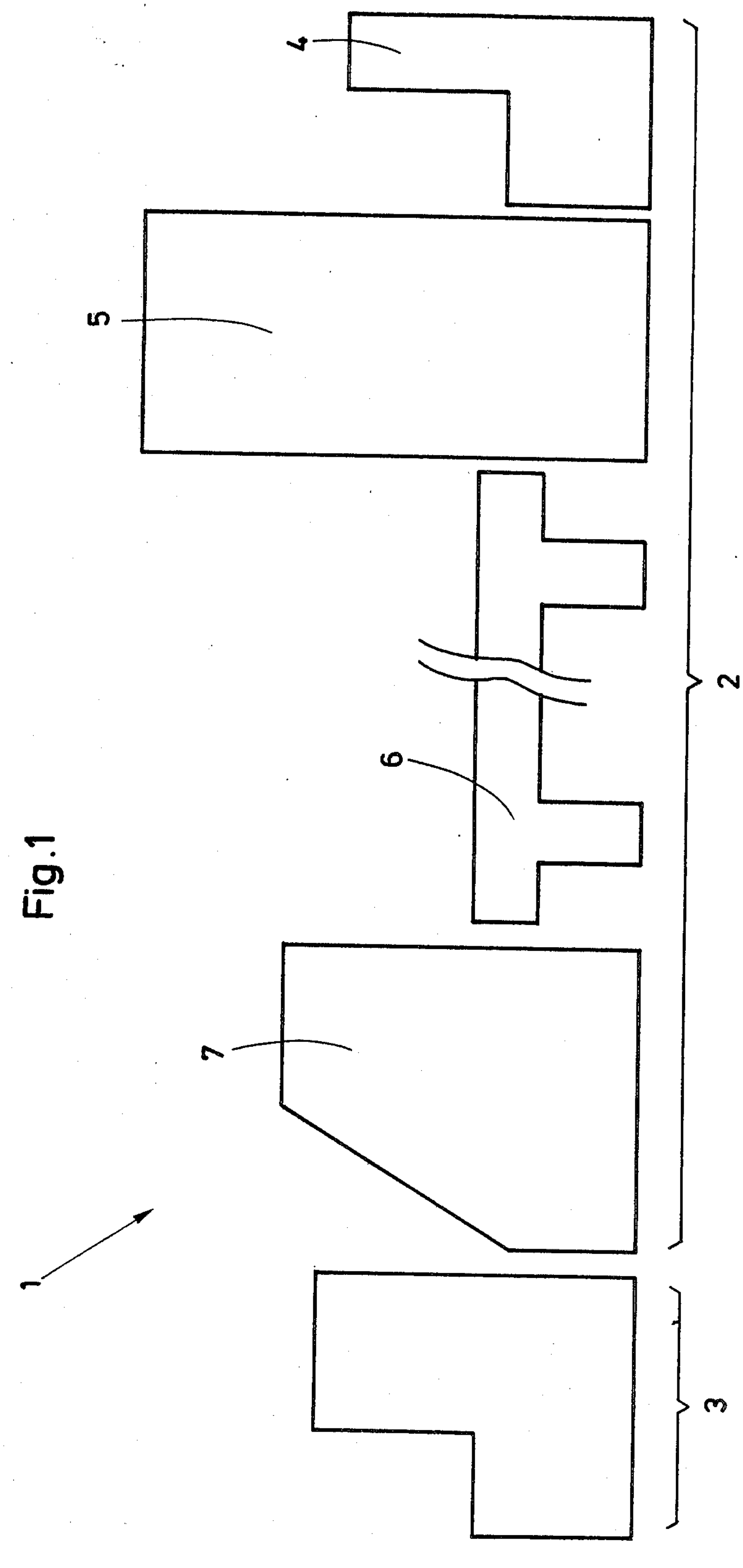
FIG. 1 is a general diagram of the apparatus.

According to FIG. 1, the apparatus 1 for the production of electrical conducting wires treated by flocking and coated with adhesive comprises a flocking device 2 for the wire and an adhesive-applying device 3. The two devices 2 and 3 are regulated and synchronised from a control panel described below, as a function of defined and recorded parameters relating to the adhesives and to the linear speed of unwinding and winding of the wire maintained in the free, unsupported state.

The flocking device comprises in particular a station 4 for unwinding the wire from a reel, a gluing station forming part of the unwinding station 4 for the distribution and gauging of an adhesive coating on the wire, a coating station 5 for the wire by passing it through a potential-difference electric field, a station 6 for drying the wire coated with synthetic fibres, this station 6 comprising also a station for brushing and cooling the wire. The flocking device 2 finally comprises a winding station 7 for the wire for its storage and future transfer towards the adhesive-applying device 3.

Figure 2:
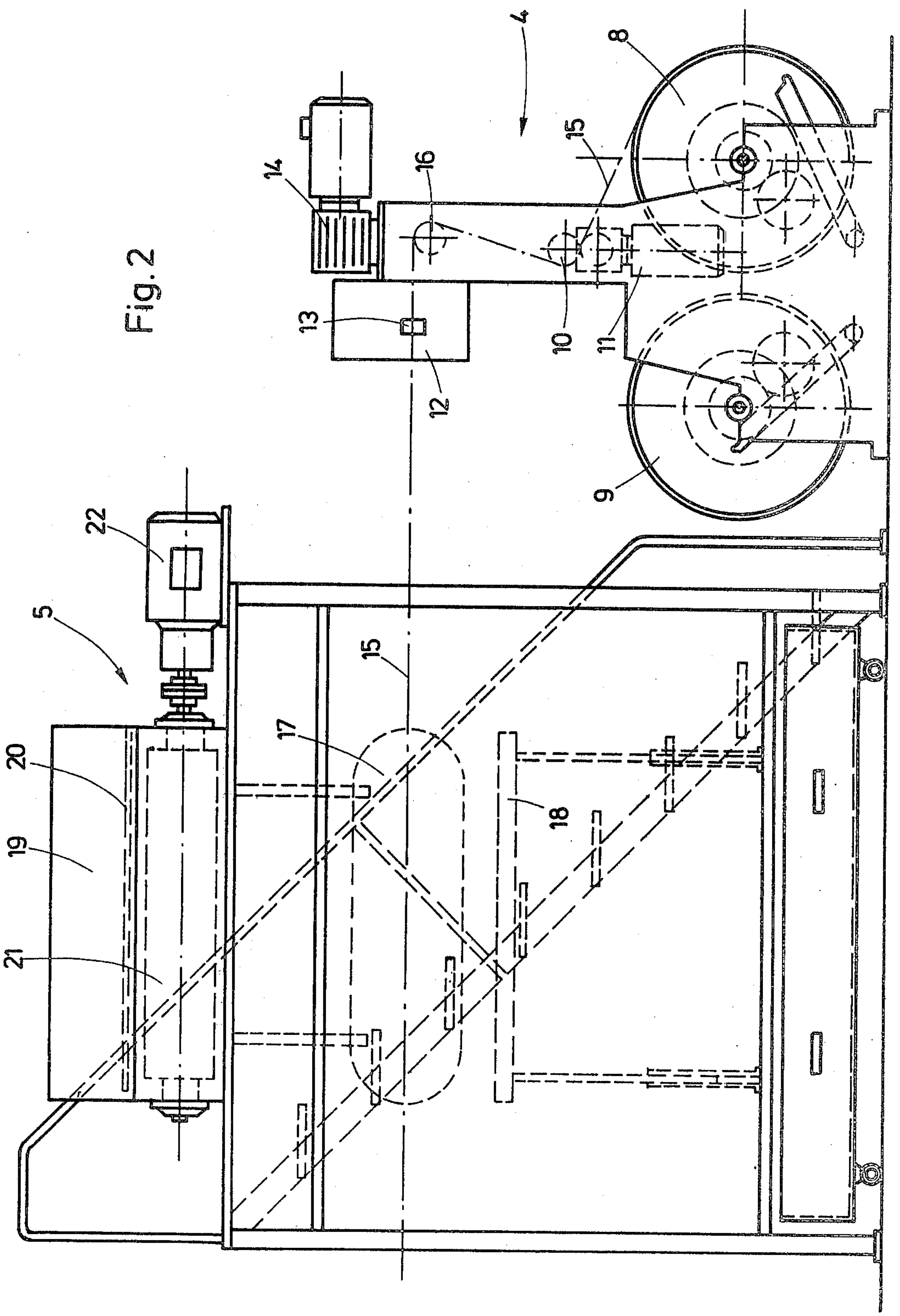
FIG. 2 is a side view of the unwinding station and gluing station and the wire-coating station of the flocking device.

According to FIG. 2, the unwinding station 4 comprises two reels 8 and 9 which one after the other supply the unwinding station 4. The reel 8 is unwound by a group of cylinders 10 driven by a motor 11. The group of cylinders 10 defines the starting point for the synchronisation and regulation of the apparatus 1. The unwinding station 4 is situated below a gluing station 12 formed by a hollow die 13 which gauges and distributes the adhesive under pressure by means of a pump 14. The electrical conducting wire 15 is unwound from the reel 8, it passes between the group of cylinders 10 by means of a cylinder 16, it passes into the hollow die 13 where it is glued over its entire periphery before passing into the coating station 5.

The coating station 5 comprises two positive electrodes 17 and two negative electrodes 18. The electrodes 17 and 18 create a potential-difference electric field, through which the wire 15 passes so as to be coated with synthetic fibres. This potential-difference field varies from 50 to 100,000 Volts. The synthetic fibres are metered by a metering appliance 19, then defibrated in the element 20 and, finally, distributed by a distributing member 21. This set of elements 19, 20, 21 is driven by a motor 22. The wire 15 thus comprises a coating of synthetic fibres and then passes into a drying station.

Figure 3:
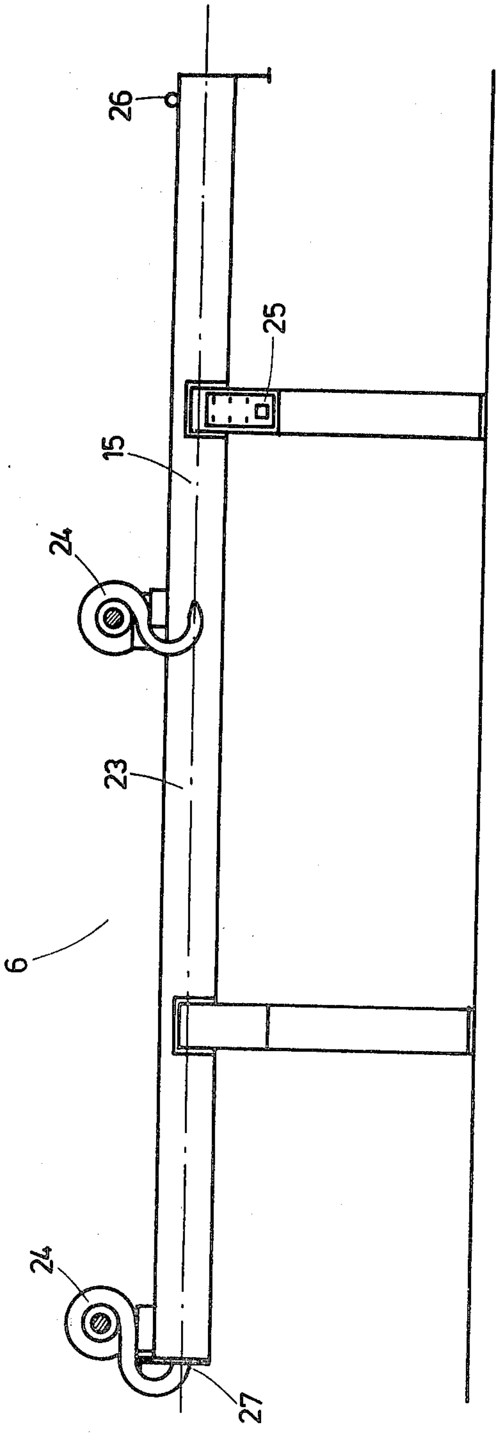
FIG. 3 is a side view of the station for drying the wire.

According to FIG. 3, the drying station 6 is constituted by a tunnel oven 23 in which the coating of the wire 15 is dried or polymerised. The tunnel oven 23 is heated by forced-air generators 24. The drying station 6 is also provided with a control panel 25 under the control of the data from station 11. Therefore, the generators 24 are controlled from this panel 25 and are regulated as a function of temperature-control members 26.

At the exit 27 from the tunnel oven 23, which is provided with a device for collecting and extracting heat and other emissions generated by the tunnel, there is arranged a station for brushing and cooling the wire 15. These stations are not shown on this figure. They are formed by nozzles for distributing air under pressure and are arranged at the exit of the tunnel oven 23 and of a cooled and ventilated tunnel.

Figure 4:
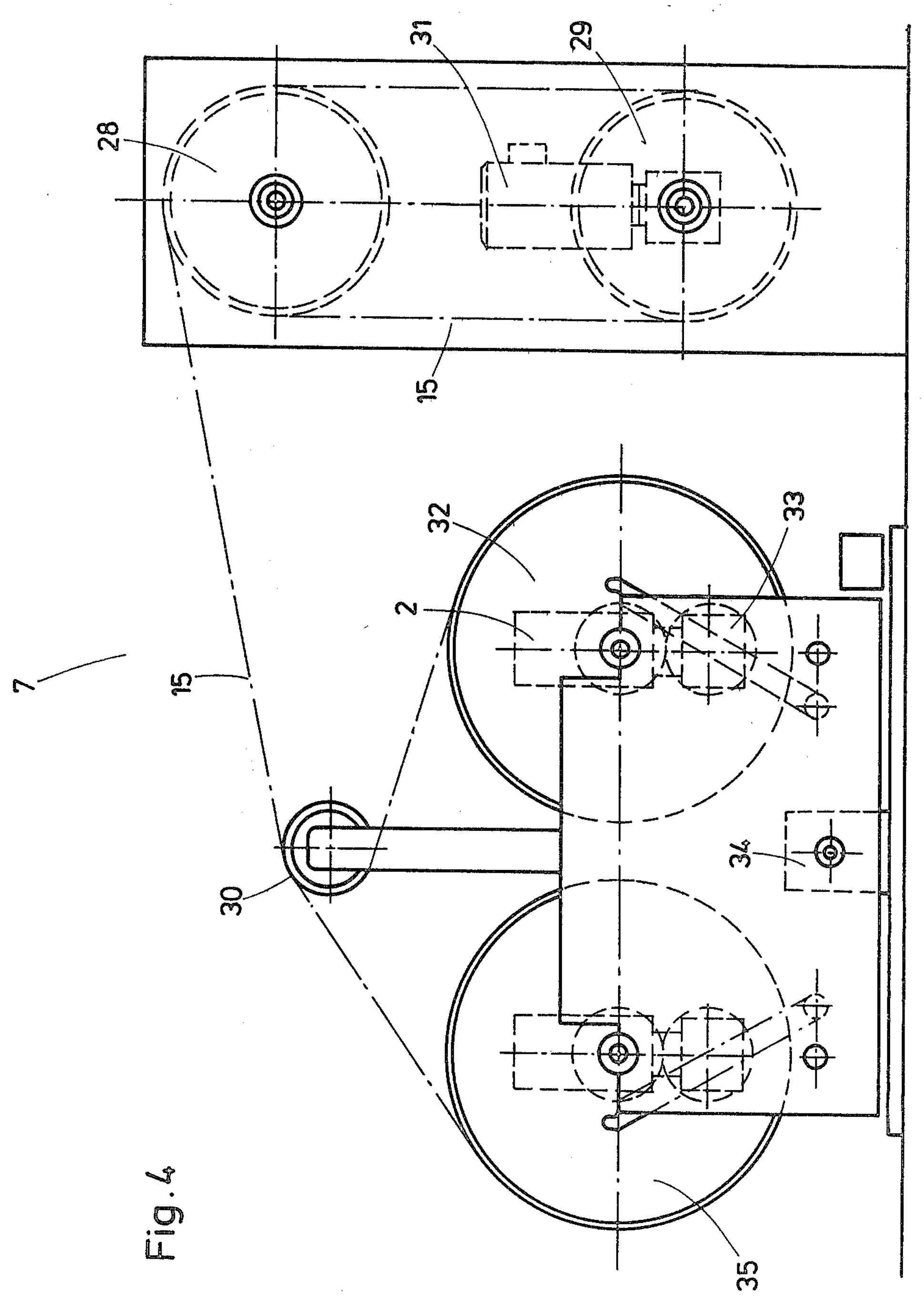
FIG. 4 is a side view of the wire-winding station of the flocking device.

According to FIG. 4, the winding station 7 firstly comprises cylinders 28, 29 working in accordance with the principle of a pulley block. The wire 15 passes over the two cylinders 28, 29 thus forming a loop before passing over a cylinder 30 under a slight tension so as to reach the storage reel 32. The cylinder 29 is driven by a constant-torque motor 31 so as to create a constant tension in the wire, thus controlling the deflection thereof starting from the die 13. This mode of procedure makes it possible to maintain the wire 15 under constant and sufficient tension, thus avoiding any exterior contact on the wire 15 after the gluing station 12 described above. The storage reel 32 is likewise driven by a constant-torque motor 33. The variable-torque motor 31 acts on the cylinders 28 and 29 as a function of the diameter of the winding of wire 15 on the reel 32. The reel 32 is caused to rotate by the motor 33. It may also be actuated with a reciprocating translational movement by means of a motor 34 as a function of the pitch of the material. According to this particular mode of embodiment, there is provided a second reel 35 similar to the reel 32 and functioning in identical manner. The second reel 35 makes possible uninterrupted production.

Figure 5:
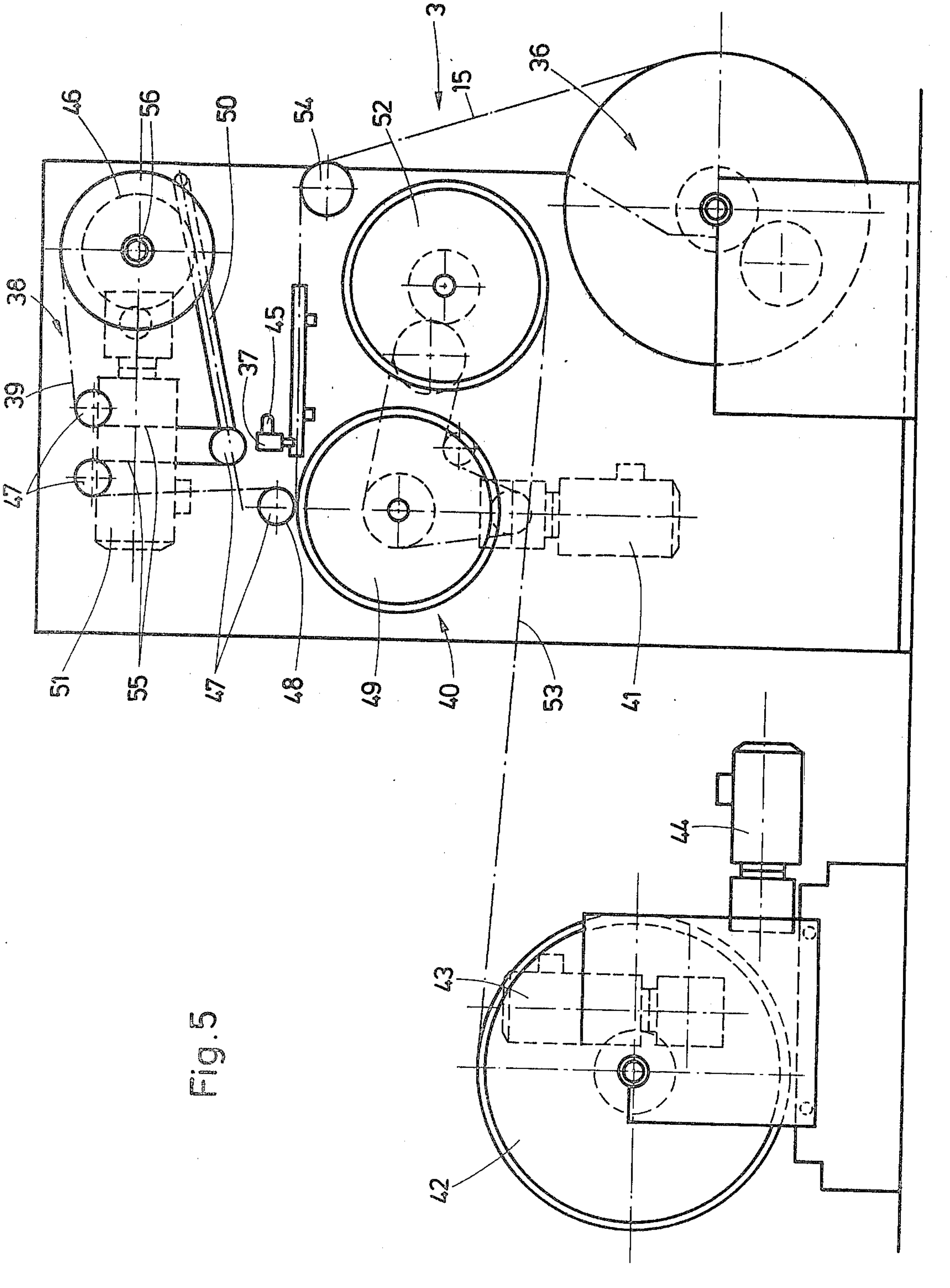
FIG. 5 is a side view of the adhesive-applying device of the apparatus.

According to FIG. 5, the adhesive-applying device 3 comprises at least one reel 36 loaded with wire 15 coming from the winding station 7 forming part of the flocking device illustrated in FIGS. 2 to 4. The adhesive-applying device 3 likewise comprises a gluing station 37, a station 38 supplying a protective film 39 intended to be placed on the glued wire 15; the device 3 is likewise provided with a group of cylinders 40 driven by a motor 41 for controlling the unwinding of the wire 15 covered with the protective film 39 and at least one storage reel 42. The storage reel 42 is caused to rotate by a variable-torque motor 43. It is likewise caused to undergo translational movement by a motor 44.

The station 37 for gluing the wire 15 is formed by a depositing head 45 for a hot melt adhesive.

The supply station 38 for the protective film 39 comprises a main reel 46 cooperating with guide members 47. The cylinder 48 is applied against the entrainment cylinder 49; this makes possible the fixing of the protective film 39, coming from the main reel 46 in passing through the guide device 47, on to the wire 15 passing through the depositing head 45. The The speed of unwinding and tension of the protective film 39 is regulated by a regulating dolly 50 serving the motor 51 and forming part of the guide members 47. The motor 51 is in synchronism with the motor 41 controlling the entrainment cylinders 49 and 52 of the wire 53 covered with a protective film under given tension.

Therefore, the wire 15 is unwound from the reel 36 and arrives under the adhesive-depositing head 45 in passing over the cylinder 54. The combined action of the cylinder 48 and cylinder 49 makes it possible to fix the protective film 39 on the wire 15. Firstly, the film 39 unwound from the main reel 46 forms two loops in passing over the guide members 47. The loop 55 is greater or lesser in extent as a function of the regulation of the dolly 50 enabling the speed of unwinding of the protective film 39 to be regulated. The motor 41 acting on the cylinders 49 and 52 for entraining the wire 53 is controlled from the control panel 25. It effects the synchronisation of the unwinding motor 51 and of the supply pump for the adhesive-depositing head 45. The wire 53 passes over the cylinders 49 and 52, thus forming a figure eight. It is wound on the reel 42 caused to rotate by the motor 43.

The supply device 38 may also comprise a cutting device (not shown in this figure) enabling the load of the main reel 46 to be cut up into narrow strips, each constituting the protective film.

According to another mode of embodiment, it is possible to cut the load of the main reel 46 before placing the latter in the adhesive-applying device. In this latter case, the cutting up takes place in a special machine over the entire width of the main reel 46, thus leaving the mandrel of this latter intact so that there is obtained a stack of plates or discs which are supported against one another and remaining as they are. The stack of plates is put into position on the axis 56 of the device 3. The successive strip plates are then unwound. When one of the strips forming a plate has been completely wound off, one passes on to the next strip forming the successive plate simply by displacement on the axis 56, this displacement corresponding to the width of one strip.

Figure 6:
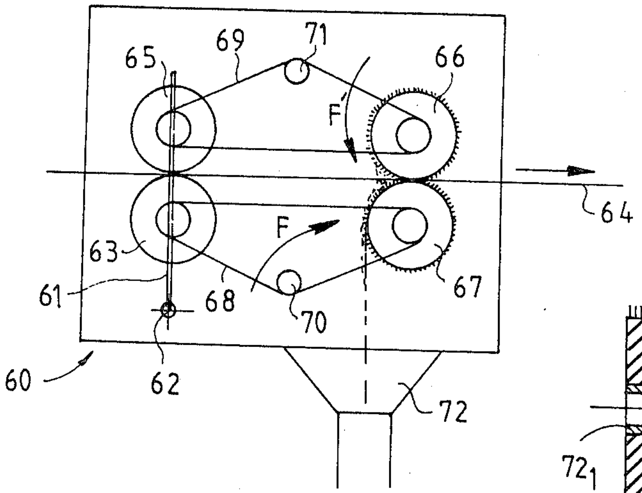
FIG. 6 is a side view of the gluing station in horizontal position.

According to FIG. 6, the gluing station 60 is a treatment unit constituting a different mode of embodiment to the gluing station 12. The gluing station 60 generally comprises a support 61 which can be positioned in a vertical plane by rotation about a pivot point or axis 62. The support 61 carries at least one support cylinder 63 which is disposed upstream of the gluing station receiving and treating the conductor wire 64.

The support cylinder 63 is essentially intended to entrain the wire 64 towards the actual gluing and constitutes the final contact point of the wire 64 which remains in the free, unsupported state as far as the winding station 7 arranged at the end of the apparatus. In the mode of embodiment described in FIG. 1, there is added to the support cylinder 63 a second entrainment cylinder 65 which, in fact, is not necessary but which in practice has proved to be a less expensive solution.

The gluing station 60 likewise comprises two gluing cylinders 66,67, the entrainment cylinders 63, 65 and also the gluing cylinders 66, 67 being arranged one above the other in pairs. Furthermore, the drive of the cylinders 66, 67 is effected by means of the cylinders 63, 65 via belts 68, 69. Tensioners 70, 71 are also provided so as to compensate for the variations in the distance of the gluing cylinders 66, 67 from the entrainment cylinders 63, 65 when the spacing between the cylinders 63,65 or 66, 67 is regulated as a function of the wire. A funnel 72 for recovering the glue is provided beneath the gluing cylinders 66, 67. In fact, the glue is brought between the cylinders 66, 67 in accordance with the arrows F and F', the surplus glue which is not retained on the surface of the wire 64 being recovered by the funnel 72 and recycled.

Figure 7:
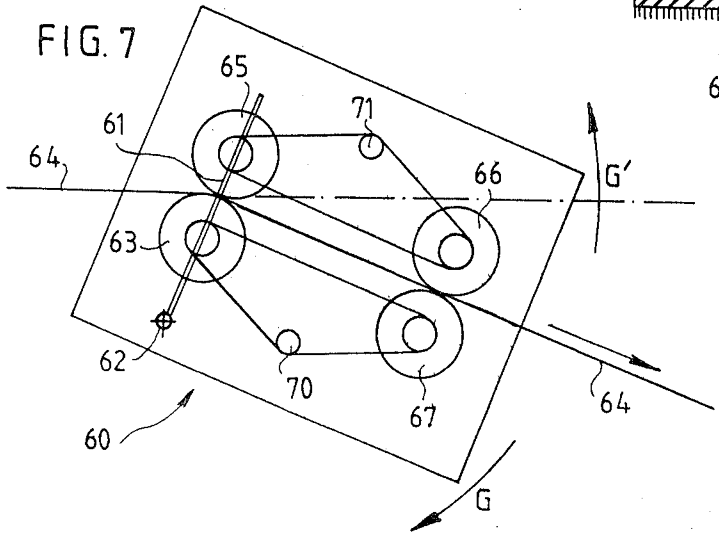
FIG. 7 is a side view of the gluing station in a position pivoted in relation to the horizontal.

According to FIG. 7, the essential feature of the gluing station 60 is the ability to undergo a swinging movement adjustable about the pivot point or axis 62. This swinging movement is effected so as to retain the deflection of the wire 64, of which the last bearing point occurs on the support cylinder 63. After that, it is no longer possible, using any type of gripping member, to grip the wire before the end of the flocking and drying stages in the stations 5 and 6. It is therefore a question in the gluing station 62 of being able to position the gluing cylinders 66, 67 as a function of the deflection assumed by the wire 64 upon leaving the support cylinder 63. The swinging movement is controlled by the support 61 and the gluing cylinders 66, 67 are shifted in accordance with the arrows G and G′ as far as a position in which the contact surface of the gluing cylinders 66, 67 coincides with the deflection of the wire 64 occurring at the level of the support cylinder 63.

Moreover, the support and entrainment cylinders 63, 65, as well as the gluing cylinders 66, 67, having respectively and in pairs an adjustable clamping distance apart and a variable linear speed as a function of the nature of the wire 64. In fact, variable linear speed means that the support and entrainment cylinders 63,65 can have the same speed of rotation as the gluing cylinders 66, 67, without thereby being of identical size, which results in a different development as a function of the diameter of the respective cylinders.

Figure 8:
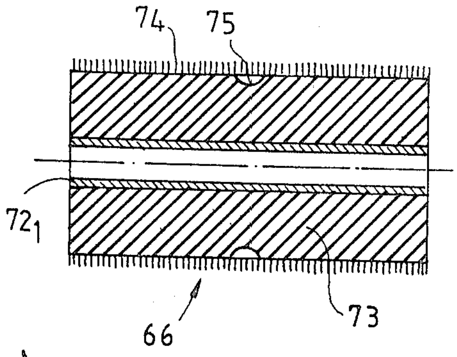
FIG. 8 is a sectional view from the side of a gluing cylinder.

According to FIG. 8, each gluing cylinder 66, 67 is formed, around the axis 72[1], from a layer of rubber concentric to the axis. The periphery of the rubber surface 73, forming the gluing surface, is provided with a covering 74 of long fibres which serve as a gluing brush. These fibres surround the wire 64 when passing between the cylinders. These fibres make possible a satisfactory homogeneous and regular distribution of the layer of glue on the electrical conducting wire which itself consists of a copper wire, for example, coated with a synthetic or plastic material.

Each gluing cylinder comprises a preformed groove 75 forming an accommodating groove for the wire 64 in the median zone of the cylinder 66, 67. The preformed groove 75 thus defines a preferential path for the wire 64 when it passes at the gluing level proper between the cylinders 66, 67.

Figure 9:
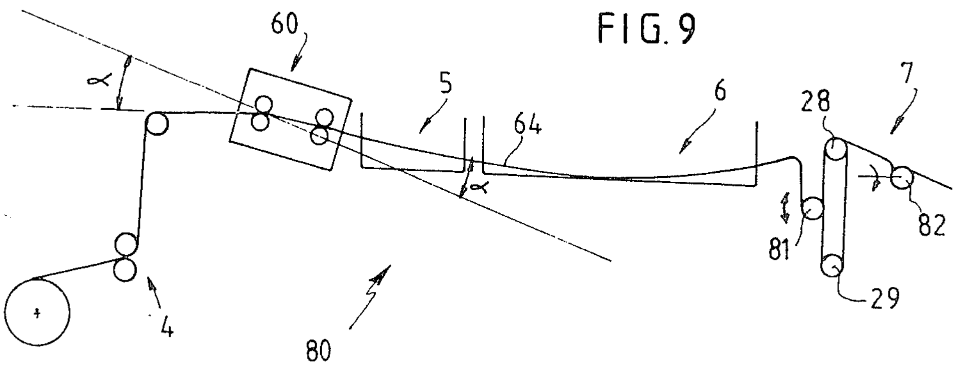
FIG. 9 is a diagrammatic view of the whole apparatus.

According to FIG. 9, the entire apparatus is illustrated diagrammatically. The unwinding station 4 is evident, as is the gluing station 60 according to the preceding FIGS. 6 to 8, also the flocking station 5, the drying station 6 covered with synthetic fibres and, finally, the winding station 7. According to this Figure, the apparatus 80 constitutes a second mode of embodiment of the apparatus. In fact, in this apparatus, in addition to the gluing station 60, two regulating dollies 81, 82 are provided arranged downstream and upstream of the cylinders 28, 29 of the winding station 7. The regulating dolly 81 is arranged between the drying station 6 and the cylinders 28, 29 of the winding station 7. The second regulating dolly 82 is arranged immediately at the exit of the cylinders 28, 29, i.e. between these cylinders and the cylinder 30 for receiving the wire to be wound on to the reels. The dollies 81, 82 make it possible to regulate the tension of the wire so that the flocked wire is wound on to the storage reel with the lowest tension possible so as not to harm the aesthetic properties of the wire. In fact, the entire problem of treating this conductor wire depends on obtaining the required aesthetic properties and this with a wire of circular section.

According to this FIG. 9, it is clearly evident that the wire 64, starting from the gluing station 60 and in particular from the support cylinder 63, exhibits a deflection upon passing into the flocking station and then the drying station. According to the apparatus 80, the entire gluing station 60 is inclined so as to retain the deflection of the wire 64 at the moment when gluing takes place, the angle of inclination of the station 60 forming an angle $\alpha$ with the deflection of the wire 64.

I claim:

1. Apparatus for producing electrical conducting wire having a coating of flock, comprising (a) first means for supporting the wire as the wire moves, (b) means for coating the wire with an adhesive as the wire moves, (c) means for depositing a coat of flock on the adhesive coated wire as the wire moves, (d) heating means for drying the flock coated wire as the wire moves, (e) means for cooling and brushing the flock coated wire as the wire moves, (f) second means for supporting the wire as the wire moves, the means specified in (b), (c), (d), and (e) above being disposed between the first and second wire support means, and (g) means for controlling the movement of the wire between the first and second wire support means whereby the moving wire is maintained in the free unsupported state therebetween.

2. Apparatus according to claim 1, further comprising (b) means for depositing pressure sensitive adhesive on the flock coat of the wire and covering the adhesive with a protective member whereby the protective member can be peeled off to expose the pressure sensitive adhesive.

3. Apparatus according to claim 1, wherein the means for coating the wire with an adhesive as the wire moves includes a pump and a hollow die for gauging and distributing the adhesive which is supplied to the die under pressure by the pump.

4. Apparatus according to claim 1 wherein the means for coating the wire with an adhesive is pivotable and carries two gluing cylinders between which the wire passes whereby the gluing cylinders coat the wire with adhesive without providing appreciable support for the wire.

5. Apparatus according to claim 4, further including support cylinders for supporting the wire, the support cylinders providing support for the wire before the wire passes between the gluing cylinders, and means permitting adjustment of the spacing between the support cylinders and the gluing cylinders.

6. Apparatus according to claim 1, wherein the means for depositing a coat of flock on the adhesive coated wire includes means for establishing an electric field through which the wire passes.

7. Apparatus according to claim 1, wherein the means for cooling and brushing the wire directs air under pressure upon the flock coated wire.

* * * * *